United States Patent
Liu et al.

(10) Patent No.: US 10,650,182 B2
(45) Date of Patent: May 12, 2020

(54) METHOD AND APPARATUS FOR DISPLAYING MULTIMEDIA CONTENT IN BROWSER

(71) Applicant: TENCENT TECHNOLOGY (SHENZHEN) COMPANY LIMITED, Shenzhen, Guangdong (CN)

(72) Inventors: Jing Liu, Shenzhen (CN); Xiaodan Lin, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 920 days.

(21) Appl. No.: 14/841,349

(22) Filed: Aug. 31, 2015

(65) Prior Publication Data

US 2015/0370759 A1 Dec. 24, 2015

Related U.S. Application Data

(63) Continuation of application No. PCT/CN2014/075906, filed on Apr. 22, 2014.

(30) Foreign Application Priority Data

Apr. 22, 2013 (CN) .......................... 2013 1 0140503

(51) Int. Cl.
*G06F 17/00* (2019.01)
*G06F 40/106* (2020.01)
(Continued)

(52) U.S. Cl.
CPC .......... *G06F 40/106* (2020.01); *G06F 3/0481* (2013.01); *G06F 3/04845* (2013.01);
(Continued)

(58) Field of Classification Search
CPC .................................................... G06F 17/212
See application file for complete search history.

(56) References Cited

U.S. PATENT DOCUMENTS

2004/0045040 A1* 3/2004 Hayward ........... G06Q 30/0277
725/135
2007/0266322 A1* 11/2007 Tretter ................. G11B 27/105
715/716
(Continued)

FOREIGN PATENT DOCUMENTS

| CN | 101098344 A | 1/2008 |
|---|---|---|
| CN | 103023752 A | 4/2013 |
| CN | 103294767 A | 9/2013 |

OTHER PUBLICATIONS

Cook, "How to Pop-Out Netflix Streaming Videos from Your Browser", Feb. 25, 2011, NPL, pp. 1-5, URL:<https://www.tested.com/tech/web/1891-how-to-pop-out-netflix-streaming-videos-from-your-browser/> (Year: 2011).*

(Continued)

*Primary Examiner* — Mustafa A Amin
(74) *Attorney, Agent, or Firm* — Morgan, Lewis & Bockius LLP

(57) ABSTRACT

A method, terminal, cache server and system for displaying multimedia content in a browser, comprising receiving a webpage identifier in a browser window for a webpage comprising multimedia content, generating a multimedia content display request corresponding to the multimedia content, and sending the multimedia content display request to server, receiving multimedia content returned from the server, activating a multimedia display plug-in of the browser to display a multimedia display window, and displaying the received multimedia content in the multimedia (Continued)

display window, wherein the multimedia display window in an initial state is smaller than the browser window.

17 Claims, 7 Drawing Sheets

(51) Int. Cl.
    *G06F 16/957* (2019.01)
    *G06F 40/14* (2020.01)
    *G06F 3/0481* (2013.01)
    *G06F 3/0484* (2013.01)

(52) U.S. Cl.
    CPC ........ *G06F 3/04847* (2013.01); *G06F 16/957* (2019.01); *G06F 40/14* (2020.01)

(56) References Cited

U.S. PATENT DOCUMENTS

| | | | | |
|---|---|---|---|---|
| 2009/0144326 | A1* | 6/2009 | Chastagnol | G06Q 30/06 |
| 2009/0259684 | A1* | 10/2009 | Knight | G06F 21/10 |
| 2010/0114947 | A1 | 5/2010 | Eftekhari | |
| 2011/0113354 | A1* | 5/2011 | Thiyagarajan | G09G 5/14 |
| | | | | 715/760 |
| 2011/0119586 | A1* | 5/2011 | Blinnikka | G06F 3/0481 |
| | | | | 715/719 |
| 2013/0266289 | A1* | 10/2013 | Oyman | H04W 76/16 |
| | | | | 386/248 |
| 2013/0318429 | A1* | 11/2013 | Dantas | G06F 3/048 |
| | | | | 715/234 |

OTHER PUBLICATIONS

Mlr, "Watch YouTube Videos in a Resizable, Floating Frame on Android", Jan. 8, 2013, NPL, pp. 1-19, URL:<https://www.addictivetips.com/android/floating-youtube-popup-video-for-android/> (Year: 2013).*

Tencent Technology, ISRWO, PCT/CN2014/075906, Jul. 23, 2014, 7 pgs.

Tencent Technology, IPRP, PCT/CN2014/075906, Oct. 27, 2015, 5 pgs.

* cited by examiner

METHOD AND APPARATUS FOR DISPLAYING MULTIMEDIA CONTENT IN BROWSER

CROSS-REFERENCE TO RELATED APPLICATIONS

This application is a continuation of International Patent Application No. PCT/CN2014/075906, entitled "Method and Apparatus for Displaying Multimedia Content in a Browser," filed on Apr. 22, 2014. This application claims the benefit and priority of Chinese Patent Application No. 201310140503.4, entitled "Method and Apparatus for Displaying Multimedia Content in a Browser," filed on Apr. 22, 2013. The entire disclosures of each of the above applications are incorporated herein by reference.

TECHNICAL FIELD

The present invention relates to the Internet, and more particularly, to a method and apparatus for displaying multimedia content in a browser.

BACKGROUND

In the prior art, a user can view videos on a mobile browser through the following steps: the user accesses a video link in a mobile browser, and the mobile browser identifies the video server, downloads the video from the video server, and invokes a video player locally-installed on the mobile device to play the video.

There are issues in the prior art methods for playing a video on a mobile device using a video player: the video player of the mobile device shares the same user interface as other content on the browser, and the video player typically plays the video in full screen mode, which prevents the user from conducting other browser operations, such as browsing the news, while viewing the video.

SUMMARY OF THE INVENTION

The present invention provides a method and apparatus for displaying multimedia content in a browser to address the issues in the prior art methods for displaying multimedia content, wherein the video player shares the same user interface with other content on the browser, which prevents the user from conducting other browser operations, such as page flipping or sliding.

In accordance with the embodiments of the present invention, a method for displaying multimedia content in a browser is provided, the method comprising: receiving a webpage identifier in a browser window for a webpage comprising multimedia content, generating a multimedia content display request corresponding to the multimedia content, and sending the multimedia content display request to a server; receiving multimedia content returned from the server; activating a multimedia display plug-in of the browser to display a multimedia display window; and displaying the received multimedia content in the multimedia display window; wherein the multimedia display window in an initial state is smaller than the browser window.

In accordance with the embodiments of the present invention, an apparatus for displaying multimedia content in a browser is provided, the method comprising: a request module configured to receive a webpage identifier in a browser window for a webpage comprising multimedia content, generate a multimedia content display request corresponding to the multimedia content, and send the multimedia content display request to a server; a multimedia content acquisition module configured to receive multimedia content returned from the server; an activation module configured to activate a multimedia display plug-in of the browser to display a multimedia display window; and a display control module configured to display the received multimedia content in the multimedia display window; wherein the multimedia display window in an initial state is smaller than the browser window.

In the embodiments of the present invention, a multimedia display plug-in is added to a browser to enable users to browse multimedia content through a multimedia display window and browser other webpage content at the same time, which improves the usability of the browser.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical features, and advantages of the embodiments of the present invention, various embodiments of the present invention will be further described in conjunction with the accompanying drawings.

Figure 1:
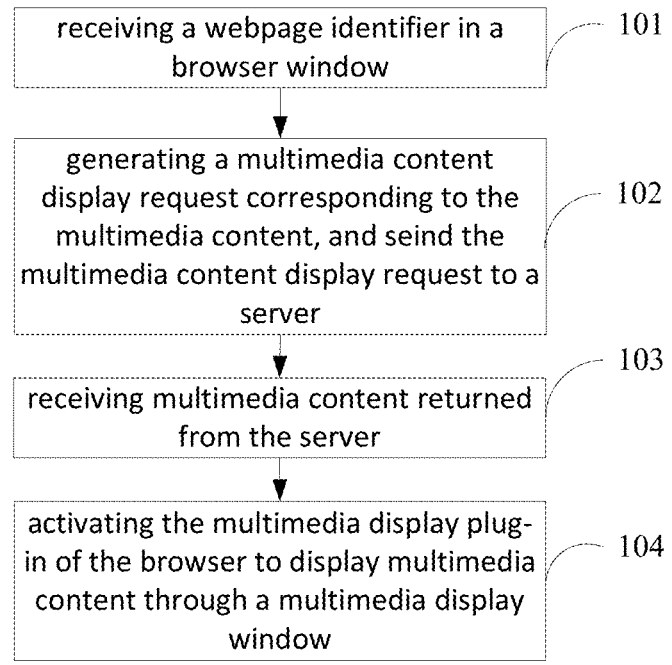
FIG. 1 is an exemplary flowchart for a method for displaying multimedia content in a browser in accordance with an embodiment of the present invention.

FIG. 1 is an exemplary flowchart for a method for displaying multimedia content in a browser in accordance with an embodiment of the present invention. As shown in FIG. 1, the method for displaying multimedia content in a browser includes the following steps:

Step 101: receiving a webpage identifier in a browser window for a webpage comprising multimedia content.

The webpage identifier may be entered into the browser, or retrieved by the browser through a link. The mobile devices in this embodiment may be cellphones, netbooks, iPads, etc., and the webpage identifier may be a web address. For example, the mobile device can be a cell phone and the webpage identifier can be a web address, and when a user inputs a web address in a mobile browser or clicks a webpage link in an open browser window, the browser determines whether it has received the corresponding webpage identifier, generates a multimedia content display request corresponding to the multimedia content, and sends the multimedia content display request to a server.

For example, the mobile browser determines whether it has received a video link or a video link embedded in a Tencent Weibo webpage, if yes, then generates a video display request and sends such request to Tencent's server to receive the corresponding video resource.

Step 102: generating a multimedia content display request corresponding to the multimedia content and sending the multimedia content display request to a server.

For example, if the user opens a basketball video from Tencent Video in a mobile browser, then the browser generates a video playing request corresponding to the basketball video and sends the video playing request to Tencent's server to receive the corresponding basketball video.

Step 103: receiving multimedia content returned from the server.

The multimedia content may comprise of videos, audio, and images, and may also be other types of multimedia content. For example, the multimedia content may be the basketball video sent from Tencent's server.

Step 104: activating a multimedia display plug-in of the browser to display a multimedia display window, and displaying the received multimedia content in the multimedia display window.

This embodiment of the present invention pre-installs a multimedia display plug-in to the browser and receives the setup information of the user, wherein the initial state of the multimedia display window is displayed in accordance with the setup information of the user, wherein the setup information comprises a size, a position and a display mode of the multimedia display window. For example, the display mode of the multimedia display window is keeping the multimedia display window to appear at the front of the browser, regardless of whether the webpage is dragged or changed in the browser, the multimedia display window always appears at the front of the browser to ensure that the user can browse webpage content and view multimedia content at the same time. In this example, the front of the browser means the display area of the browser, for example, the top layer of the mobile display, which may cover the display area of the mobile browser in whole or in part.

It is obvious that the multimedia display window covers the browser interface in whole or in part. For example, if the multimedia display window covers the top half of the browser display area and the window size is large, then the first few lines of the current webpage content is covered by the multimedia display window, and the user may drag the webpage or reduce the size of the multimedia display window to view the webpage content covered by the multimedia display window.

Preferably, the multimedia display window at an initial state is smaller than the browser window. Specifically, at the initial state, the multimedia display window has a first interface, and the browser window has a second interface, wherein the first interface is smaller than the second interface so that the user can use the second interface in the browser for other activity while viewing multimedia content in the multimedia display window. For example the user can simultaneously watch a basketball game and browse sports news related to the basketball game or change the webpage. For a more detailed description of the multimedia display window, please refer to FIG. 2 and its description below. The size and/or position of the multimedia display window may be adjusted by the user.

In this embodiment, two modes for activating the multimedia display plug-in, displaying the multimedia display window through the multimedia display plug-in, and displaying the multimedia content in the multimedia display window are provided. In the first mode, upon receiving multimedia content from the server, the multimedia display window is directly displayed through the multimedia display plug-in. In the second mode, it is determined whether an instruction to display the multimedia display window is received; if so, the multimedia display window is displayed through the multimedia display plug-in. For example, a "small window display" button can be added to the normal video display window, and the multimedia display plug-in displays the pre-set multimedia display window when a user clicks the "small window display" button.

Figure 2:
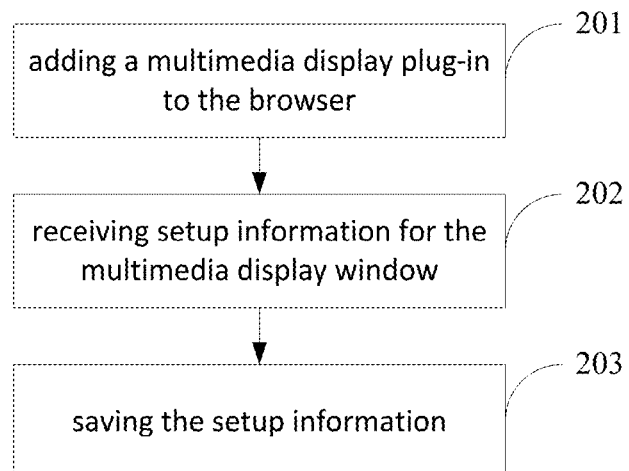
FIG. 2 is a detailed exemplary flowchart for pre-setting the multimedia display window in accordance with an embodiment of the present invention.

FIG. 2 is a detailed exemplary flowchart for pre-setting the multimedia display window in accordance with an embodiment of the present invention. As shown in FIG. 2, the method includes the following steps.

Step 201: adding a multimedia display plug-in to the browser.

The multimedia display plug-in displays the multimedia display window and plays the multimedia content in the multimedia display window.

Step 202: receiving setup information for the multimedia display window.

The setup information comprises a size, a position and a display mode. During the implementation, the multimedia display window in an initial state may be adjusted based on the setup information of the user. For example, the first display interface of the multimedia display window can be adjusted to be smaller than the second display interface, and the position of the multimedia display window can be adjusted to be in the top left corner of the browser, and the display mode is keeping the multimedia display window as the top most interface of the browser.

FIGS. 3a to 3d are exemplary diagrams for displaying multimedia content in a browser in accordance with an embodiment of the present invention.

Figure 3A:
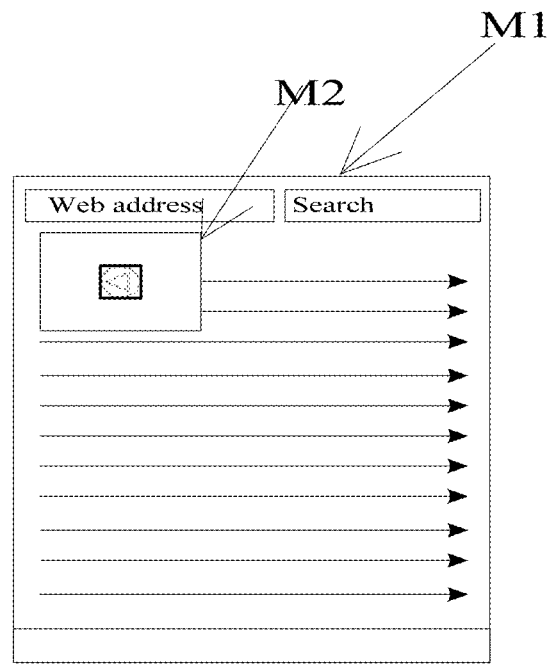
FIGS. 3a to 3d are exemplary diagrams for displaying multimedia content in a browser in accordance with an embodiment of the present invention.

As shown in FIG. 3a, an exemplary diagram for the initial state of a multimedia display window is provided, wherein the second display interface of browser M1 is larger than the first display interface of multimedia display window M2, and multimedia display window M2 is located in the top left corner of browser M1, as such, the user may browse news in other parts of the browser while multimedia display window M1 displays multimedia content.

Figure 3B:
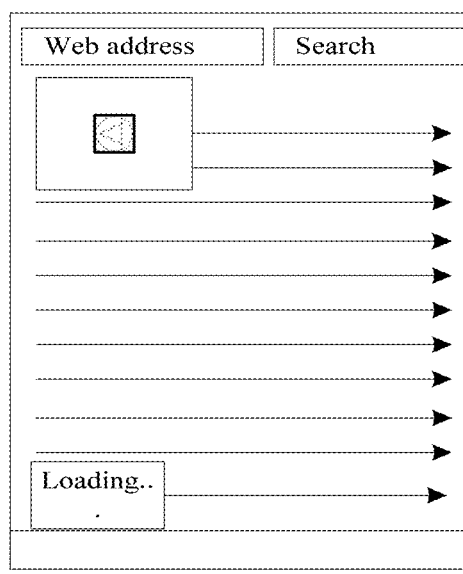
Figure 3C:
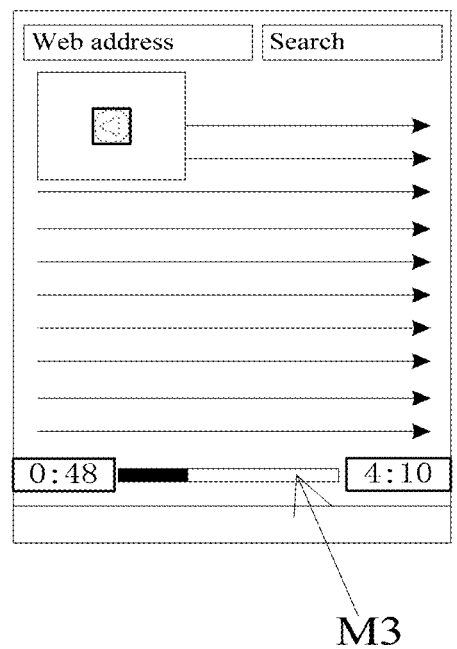

Further, as shown in FIGS. 3b and 3c, the download mode and download status may be displayed when downloading multimedia content from the server, for example, as shown in FIG. 3c, the download status bar M3 displays the current download status of multimedia content, and when download is completed, the multimedia display window displays the multimedia content.

Figure 3D:
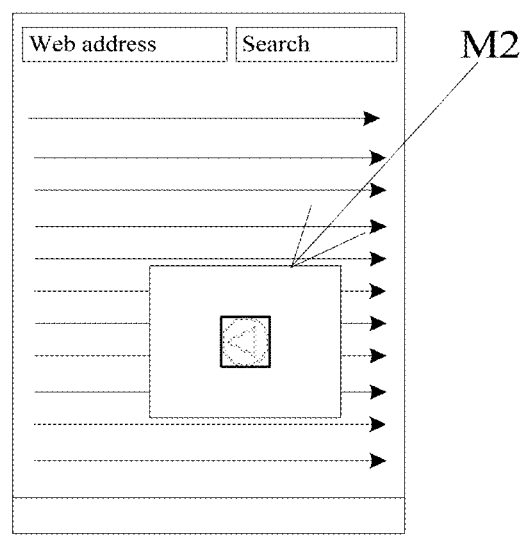

As shown in FIG. 3d, the user may adjust the display position and the size of the multimedia display window M2, for example, after the adjustment, the display interface of the multimedia display window M2 in FIG. 3d is larger than the display interface of the multimedia display window M2 in FIG. 3a.

Step 203: saving the setup information.

In this embodiment of the present invention, after saving the setup information, the multimedia plug-in may display the multimedia display window when the browser receives a video link or when the browser receives an instruction to display the multimedia display window.

Figure 4:
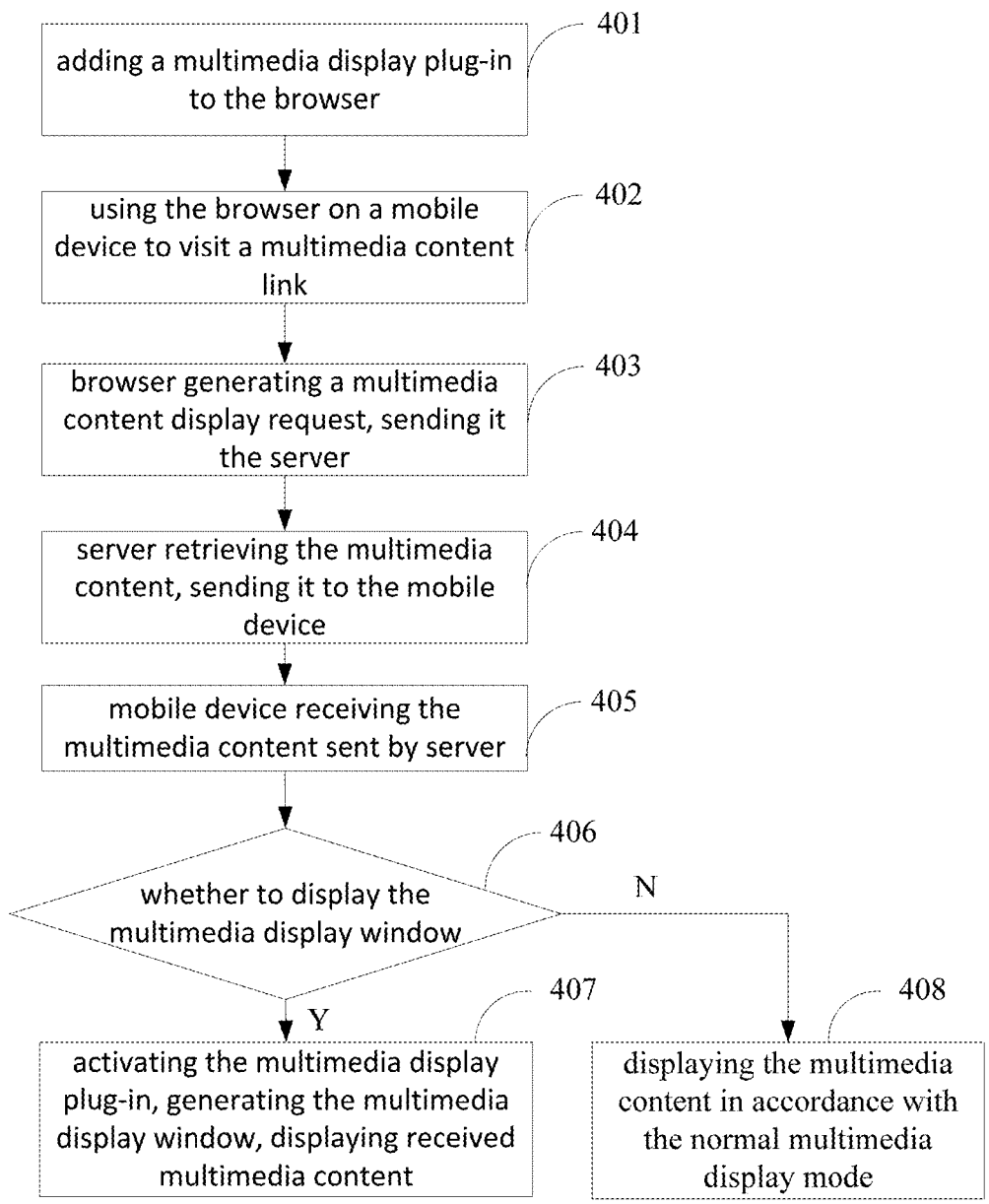
FIG. 4 is an exemplary flowchart for a method for displaying multimedia content in a browser in accordance with another embodiment of the present invention.
Figure 5:
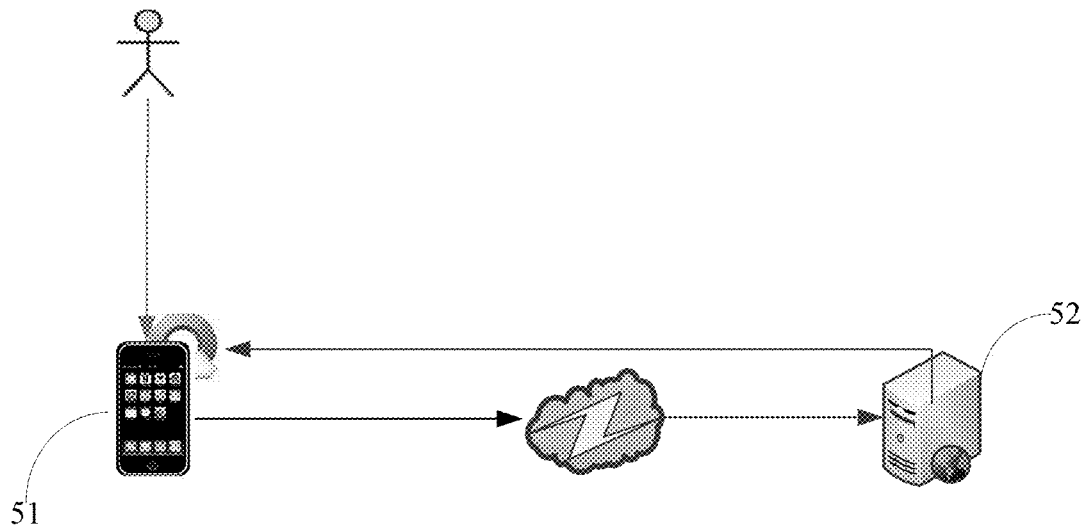
FIG. 5 is an exemplary schematic diagram for a multimedia content display apparatus in a browser in accordance with an embodiment of the present invention.

FIG. 4 is an exemplary flowchart for a method for displaying multimedia content in a browser in accordance with another embodiment of the present invention, and FIG. 5 is a schematic diagram for a multimedia content display apparatus for a browser in accordance with another embodiment of the present invention. As shown in FIG. 5, the apparatus comprises a touch screen mobile device 51, and a server 52, such as a Tencent video server, a Tudou video server, a Youku video server or an iQIYI video server. As shown in FIG. 4, the method comprises the following steps.

Step 401: a multimedia display plug-in is added to the browser.

The multimedia display plug-in corresponds to a multimedia display window, and may be used to display the multimedia display window and play multimedia content through the multimedia display window. A detailed description of setting up the multimedia display window is provided in FIG. 2.

Step 402: the user visits the multimedia content link through the browser of a mobile device 51. For example, the multimedia content link may be a video link, wherein each video link has a unique identifier, usually pre-set in the source code of an http webpage. For example, the Weibo page often includes video links, such as http://t.cn/zYYG2UH.

Step 403: a multimedia content display request is generated by the browser based on the multimedia content links, and is sent to the server 52.

For example, the user opens the webpage or inputs the European Cup video link http://v.qq.com/cover/v/v2lildtfirmkljy9.html in the browser of mobile device 51, the browser receives the video link and sends a video play request to the Tencent video server, and retrieves the video resource corresponding to the European Cup.

Step 404: server 52 retrieves the corresponding multimedia content and sends the multimedia content to the mobile device 51.

The server distributes multimedia content type suited for mobile device 51 to the mobile device 51, for example if the mobile device 51 uses Audio Video Interleaved (AVI) format, the server sends the video in AVI format to the mobile device 51.

Step 405: mobile device 51 receives multimedia content from the server 52.

Step 406: it is determined whether to display the multimedia display window, if yes, continue to Step 407; otherwise, continue to Step 408.

In this embodiment, two modes to determine whether to display to multimedia display window are provided. In the first mode, upon receiving multimedia content from the server, the multimedia display window is directly displayed through the multimedia display plug-in, and the user needs to setup the initiate state of the multimedia display window. In the second mode, it is determined whether an instruction to display the multimedia display window is received; if so, the multimedia display window is displayed through the multimedia display plug-in. For example, a "small window display" button can be added to the normal video display window, and the multimedia display plug-in displays the pre-set multimedia display window when a user clicks the "small window display" button. More preferably, the video display window includes a "start downloading" button, and the mobile device 51 begins to download multimedia information from server 52 when the user clicks the "start downloading" button, and if the user clicks the "small window display" button during the download process, then the pre-set multimedia display window is displayed through the multimedia display plug-in.

Step 407: the multimedia display plug-in of the browser is activated to display the multimedia display window and retrieve multimedia content through the multimedia display window.

Step 408, the multimedia content is displayed in accordance with the normal multimedia display mode.

The normal multimedia display mode is the prior art method of playing videos in a video display window embedded in a browser.

When receiving the multimedia content of the server and simultaneously displaying download status, for example as shown in FIGS. 3b and 3c, the download status bar M3 in FIG. 3C displays the current download status of multimedia content, and downloaded content that meets certain conditions is displayed in the multimedia display window. For example, any multimedia content with more than 10% downloaded is displayed.

The server determines the webpage identifier of the browser window and distributes multimedia content that matches the format of the browser. For example, if the server determines that the video player of mobile device 51 supports AVI format based on the identifier of mobile device 51, it retrieves video in AVI format and sends to mobile device 51, and then mobile device 51 plays the video through the pre-set multimedia display window of the browser. This process will not be discussed further here.

During the process of displaying multimedia content in the multimedia display window, this embodiment of the present invention determines whether a size adjustment gesture related to the multimedia display window is received, if yes, then adjusts the size of the multimedia display window on a sliding direction of the size adjustment gesture, for example as shown in FIGS. 3a and 3d, wherein the multimedia display window M2 in FIG. 3d is larger than the multimedia display window M2 in FIG. 3a.

Further, during the process of displaying multimedia content in the multimedia display window, this embodiment of the present invention determines whether a position adjustment gesture related to the multimedia display window is received, if yes, then adjusts the position of the multimedia display window on a sliding direction of the position adjustment gesture, for example as shown in FIGS. 3a and 3d, wherein the multimedia display window M2 in FIG. 3a is located in the top left corner of the browser and the multimedia display window M2 in FIG. 3d is dragged to the center of the browser.

Further, during the process of displaying multimedia content in the multimedia display window, this embodiment of the present invention determines whether a browser operation gesture for the webpage in the browser window is received, the browser operation gesture may comprise of dragging down the webpage, a page change or inputting characters in the text input bar of the browser; if a browser operation gesture for the webpage in the browser window is received, then the position of the multimedia display window is kept at the top most interface of the browser, which is to ensure that the multimedia display window is kept at the top interface of the browser during browser operation and not covered by another webpage of the browser.

Further, during the process of displaying multimedia content in the multimedia display window, this embodiment of the present invention determines whether an instruction to close the multimedia display window is received, for example, the multimedia display window may comprise a close button in the top right corner, wherein the instruction to close the multimedia display window is deemed to be received if the user clicks the close button, and the multimedia window is closed.

This embodiment of the present invention adjusts the size, the position and the display mode of the multimedia display window by adding a multimedia display plug-in, which enables the user to conduct webpage browsing while viewing multimedia content in the browser.

Figure 6A:
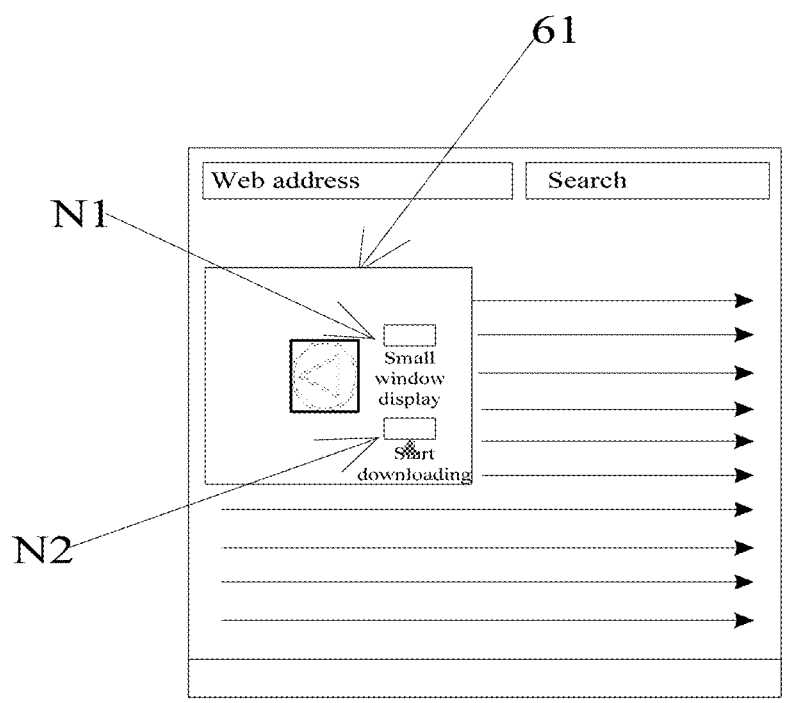
FIGS. 6a to 6c is an exemplary diagram for a video player window to play videos in accordance with an embodiment of the present invention.
Figure 6B:
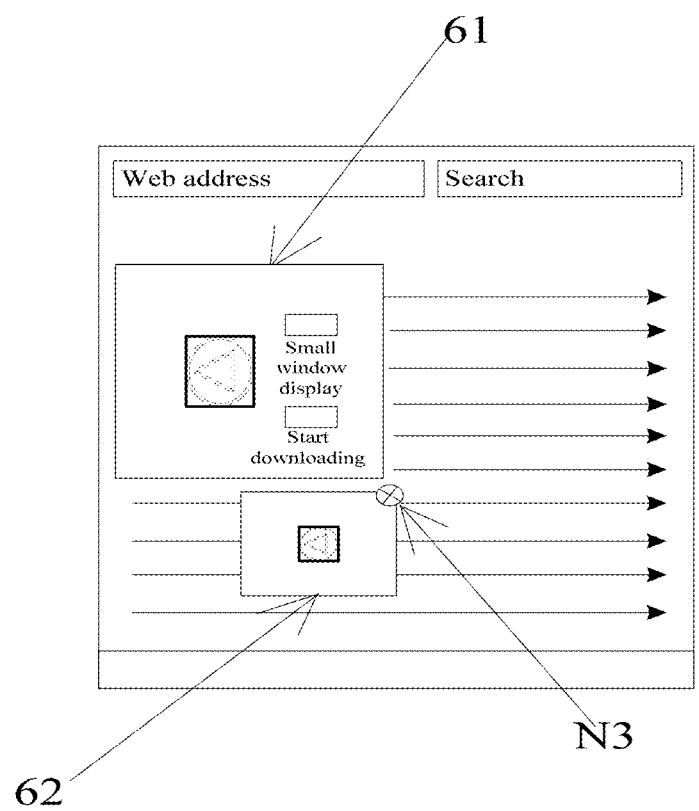
Figure 6C:
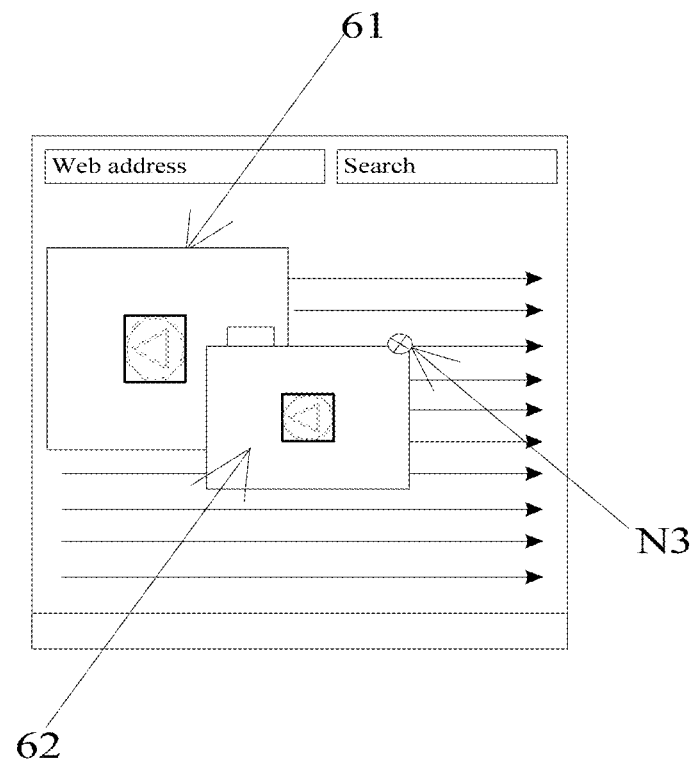

FIGS. 6a to 6c is an exemplary diagram for a video player window to play videos in accordance with an embodiment of the present invention.

As shown in FIG. 6a, when the user views a webpage comprising multimedia content in a browser window, the browser first displays an embedded video display window 61, wherein the embedded video display window 61 is the normal video display method, is set up in the browser and shares an interface with the current webpage of the browser; when the current webpage is changed, the embedded video display window 61 is covered by the new webpage along with the current webpage, or when the current webpage is dragged down, the embedded video display window 61 shifts along with the webpage.

The embedded video display window 61 comprises a small window playing button N1 and a start downloading button N2, wherein the user may click the small window player N1 to display the pre-set video display window 62 (as shown in FIG. 6b) through the video playing plug-in, and click the start downloading button N2 to download video resources from the server.

For example, as shown in FIG. 6b, in the process of downloading and playing videos simultaneously in the embedded video display window 61, the user may display the pre-set video display window 62 through the video playing plug-in by clicking the small window playing button N1, and play the video content downloaded by the embedded video display window 61 through the pre-set video display window 62. To save resources, when the pre-set video display window 62 is playing video content, the embedded video display window 61 does not play video content. Further, when video content is played in the pre-set video display window 62, the size and position of the pre-set video display window 62 may be adjusted based on the size adjustment gesture and the position adjustment gesture of the user. For example, as shown in FIGS. 6b and 6c, the pre-set video display window 62 is located in the bottom half of the browser display in FIG. 6b, and the size is small, so the user may adjust the size and position of the pre-set video display window 62 by dragging the window, as shown in FIG. 6c, wherein the pre-set video display window 62 is moved to the center of the browser display, and covers in part the embedded video display window 61, and the size of the pre-set video display window 62 is larger than that of FIG. 6b.

Further, during the process of displaying multimedia content in the multimedia display window, this embodiment of the present invention determines whether an instruction to close the pre-set video display window 62 is received, as shown in FIGS. 6b and 6c, wherein the pre-set video display window 62 comprises a close button N3 in the top right corner, wherein the instruction to close the pre-set video display window 62 is deemed to be received if the user clicks the close button N3, and the pre-set video display window 62 is closed.

Figure 7:
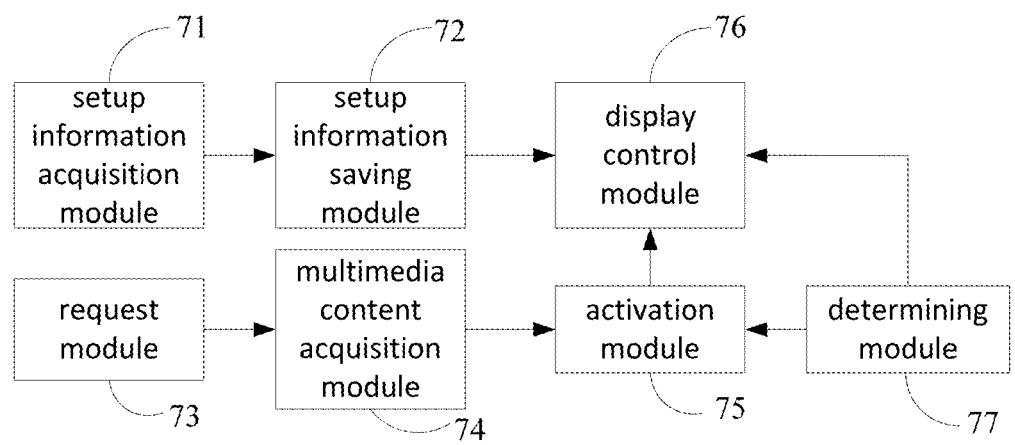
FIG. 7 is an exemplary schematic diagram for an apparatus for displaying multimedia content in a browser in accordance with an embodiment of the present invention.

FIG. 7 is an exemplary schematic diagram for an apparatus for displaying multimedia content in a browser in accordance with an embodiment of the present invention. As shown in FIG. 7, the apparatus includes a setup information acquisition module 71, a setup information saving module 72, a request module 73, a multimedia content acquisition module 74, an activation module 75, a display control module 76 and a determination module 77.

The setup information acquisition module 71 receives setup information, wherein the setup information comprises a size, a position and a display mode of the multimedia display window. The multimedia display window in an initial state may be adjusted based on the setup information of the user. The preferred display method for the multimedia display window includes: keeping the multimedia display window at the front of the browser, regardless of whether the webpage is dragged or changed in the browser. The multimedia display window appears at the front of the browser to ensure that the user can browser webpage content and receive multimedia content at the same time. The setup information saving module 72 saves the setup information received in the setup information acquisition module 71.

It is obvious that the multimedia display window covers the browser interface in whole or in part. For example, if the multimedia display window covers the top half of the browser display area and the window size is large, then the multimedia display window may cover the first few lines of webpage content on the current webpage, the user may drag the webpage or reduce the size of the multimedia display window to view the webpage content covered by the multimedia display window.

Further, the multimedia display window has the first interface, and the browser window has the second interface, wherein the first interface is smaller than the second interface, such that the user can use the second interface in the browser for other activity while viewing multimedia content in the multimedia display window, for example the user can watch a basketball game while browsing sports news related to the basketball game and changing the webpage; for a detailed description please refer to FIG. 2 and its description. The size and/or position of the multimedia display window may be adjusted by the user.

The request module 73 receives a webpage identifier opened or inputted by user in the browser, generates a multimedia display request corresponding to the webpage identifier, and sends the multimedia display request to the server, the multimedia content acquisition module 74 receives multimedia content returned by the server.

Multimedia content comprises video, audio and images, thus the multimedia display window can play video, audio and display images.

The activation module 75 activates the multimedia display plug-in in the browser, and displays the corresponding multimedia display window through the multimedia display plug-in, the display control module 76 controls the multimedia display window and displays the multimedia content received by the multimedia content acquisition module 74.

The determination module 77 determines whether an instruction to display the multimedia display window is received, if yes, then the activation module 75 activates the multimedia display plug-in in the browser, and displays the corresponding multimedia display window through the multimedia display plug-in. For example, under the current method, the video display window embedded in a browser comprises a "small window display" button (as shown in FIG. 6a), wherein the instruction to display the multimedia display window is deemed to be received when the user clicks the "small window display" button, and the multimedia display window is displayed through the pre-set multimedia display plug-in.

During the process of displaying multimedia content in the multimedia display window, the determination module 77 determines whether a position adjustment gesture related to the multimedia display window is received, if yes, then the display control module 76 adjusts the position of the multimedia display window on a sliding direction of the position adjustment gesture.

During the process of displaying multimedia content in the multimedia display window, the determination module 77 determines whether a browser operation gesture for the webpage in the browser window is received, the browser operation gesture may comprise of pulling down the webpage, a page change or inputting characters in the text input bar of the browser; if a browser operation gesture for the webpage in the browser window is received, then the display control module 76 keeps constant the position of the multimedia display window at the top most interface of the browser.

During the process of displaying multimedia content in the multimedia display window, the determination module 77 determines whether a size adjustment gesture related to the multimedia display window is received, if yes, then the display control module 76 adjusts the size of the multimedia display window on a sliding direction of the size adjustment gesture.

The present invention adjusts the size, the position and the display mode of the multimedia display window by adding a multimedia display plug-in, which enables the user to conduct webpage browsing while viewing multimedia content in the browser, increasing efficiency of the browser and saving resources of the backend server of the browser.

The various embodiments of the present invention are merely preferred embodiments, and are not intended to limit the scope of the present invention, which includes any modification, equivalent, or improvement by a person of ordinary skill in the art that does not depart from the spirit and principles of the present invention.

What is claimed is:

1. A method for displaying multimedia content in a browser, comprising:
   at a mobile electronic device:
   receiving a first webpage identifier in a browser window for a first webpage, wherein the browser window includes a multimedia display plug-in;
   sending a first request to a server for the first webpage, wherein the server determines a video format supported by the mobile electronic device based on an identifier of the mobile electronic device included in the first request;
   receiving the first webpage from the server, wherein: (i) the first webpage comprises an embedded display window configured to play video content in the video format, and (ii) the embedded display window includes (a) a first affordance to play the video content in the embedded display window, (b) a second affordance, distinct from the first affordance, to download the video content, and (c) a third affordance, distinct from the first and second affordances, to launch the multimedia display plug-in;
   in response to a user selection of the first affordance, playing the video content in the video format from the server in the embedded display window;
   in response to a user selection of the second affordance, downloading the video content in the video format from the server to the mobile electronic device;
   after the user selection of the second affordance and in response to a subsequent user selection of the third affordance, activating the multimedia display plug-in of the browser to display a multimedia display window on top of the first webpage, the multimedia display window including a counterpart affordance to the first affordance;
   suspending the play of the video content in the embedded display window and playing the video content, downloaded from the server, in the multimedia display window in response to user selection of the counterpart affordance, wherein the multimedia display window in an initial state is smaller than the browser window; and
   while playing the video content in the multimedia display window:
   receiving a second webpage identifier in the browser window for a second webpage distinct from the first webpage;
   sending a second request to the server for the second webpage;
   receiving the second webpage from the server; and
   replacing display of the first webpage with the second webpage,
   wherein the multimedia display window continues to play the downloaded video content after the replacing.

2. The method of claim 1, further comprising, prior to the step of receiving the first webpage identifier in the browser window:
   receiving setup information for the multimedia display window, wherein the setup information comprises a size, a position, and a display mode of the multimedia display window; and
   saving the setup information.

3. The method of claim 1, wherein displaying the received multimedia content in the multimedia display window further comprises:
   determining whether a position adjustment gesture related to the multimedia display window is received; and
   in response to determining that the position adjustment gesture related to the multimedia display window is received, adjusting the position of the multimedia display window on a sliding direction of the position adjustment gesture.

4. The method of claim 1, wherein displaying the received multimedia content in the multimedia display window further comprises:
   determining whether a browser operation for the first webpage in the browser window is received prior to receiving the second webpage identifier in the browser window for the second webpage; and
   in response to determining that the browser operation for the first webpage in the browser window is received, executing the browser operation and keeping constant the position of the multimedia display window, wherein the browser operation is a scroll operation.

5. The method of claim 1, wherein displaying the multimedia content through the multimedia display window further comprises:
   determining whether a size adjustment gesture related to the multimedia display window is received; and
   in response to determining that the size adjustment gesture related to the multimedia display window is received, adjusting the size of the multimedia display window based on a sliding direction of the size adjustment gesture.

6. The method of claim 1, wherein the multimedia content window is a popup window of the browser window.

7. The method of claim 1, wherein the embedded display window and the multimedia content window are displayed simultaneously.

8. The method of claim 1, wherein the embedded display window is prevented from playing the video content after the user selection of the third affordance.

9. A mobile electronic device comprising:
one or more processors; and
memory storing one or more programs for execution by the one or more processors, the one or more programs including instructions for:
receiving a first webpage identifier in a browser window for a first webpage, wherein the browser window includes a multimedia display plug-in;
sending a first request to a server for the first webpage, wherein the server determines a video format supported by the mobile electronic device based on an identifier of the mobile electronic device included in the first request;
receiving the first webpage from the server, wherein: (i) the first webpage comprises an embedded display window configured to play video content in the video format, and (ii) the embedded display window includes (a) a first affordance to play the video content in the embedded display window, (b) a second affordance, distinct from the first affordance, to download the video content, and (c) a third affordance, distinct from the first and second affordances, to launch the multimedia display plug-in;
in response to a user selection of the first affordance, playing the video content in the video format from the server in the embedded display window;
in response to a user selection of the second affordance, downloading the video content in the video format from the server to the mobile electronic device;
after the user selection of the second affordance and in response to a subsequent user selection of the third affordance, activating the multimedia display plug-in of the browser to display a multimedia display window on top of the first webpage, the multimedia display window including a counterpart affordance to the first affordance;
suspending the play of the video content in the embedded display window and playing the video content, downloaded from the server, in the multimedia display window in response to user selection of the counterpart affordance, wherein the multimedia display window in an initial state is smaller than the browser window; and
while playing the video content in the multimedia display window:
receiving a second webpage identifier in the browser window for a second webpage distinct from the first webpage;
sending a second request to the server for the second webpage;
receiving the second webpage from the server; and
replacing display of the first webpage with the second webpage, wherein the multimedia display window continues to play the downloaded video content after the replacing.

10. The mobile electronic device of claim 9, wherein the one or more programs further include instructions for, prior to the step of receiving the first webpage identifier in the browser window:
receiving setup information for the multimedia display window, wherein the setup information comprises a size, a position, and a display mode of the multimedia display window; and
saving the setup information.

11. The mobile electronic device of claim 9, wherein displaying the received multimedia content in the multimedia display window further comprises:
determining whether a position adjustment gesture related to the multimedia display window is received; and
in response to determining that the position adjustment gesture related to the multimedia display window is received, adjusting the position of the multimedia display window on a sliding direction of the position adjustment gesture.

12. The mobile electronic device of claim 9, wherein displaying the multimedia content through the multimedia display window further comprises:
determining whether a browser operation for the first webpage in the browser window is received prior to receiving the second webpage identifier in the browser window for the second webpage; and
in response to determining that the browser operation for the first webpage in the browser window is received, executing the browser operation and keeping constant the position of the multimedia display window, wherein the browser operation is a scroll operation.

13. The mobile electronic device of claim 9, wherein displaying the received multimedia content in the multimedia display window further comprises:
determining whether a size adjustment gesture related to the multimedia display window is received; and
in response to determining that the size adjustment gesture related to the multimedia display window is received, adjusting the size of the multimedia display window based on a sliding direction of the size adjustment gesture.

14. The mobile electronic device of claim 9, wherein the multimedia content window is a popup window of the browser window.

15. The mobile electronic device of claim 9, wherein the embedded display window and the multimedia content window are displayed simultaneously.

16. The mobile electronic device of claim 15, wherein the embedded display window is distinct and separate from the multimedia content window.

17. The mobile electronic device of claim 9, wherein the embedded display window is prevented from playing the video content after the user selection of the third affordance.

* * * * *